Nov. 14, 1933.  A. KAMINSKY  1,935,472

PIPE CONNECTION

Filed March 16, 1933

WITNESSES

INVENTOR
Albert Kaminsky
BY
ATTORNEYS

Patented Nov. 14, 1933

1,935,472

UNITED STATES PATENT OFFICE 1,935,472

PIPE CONNECTION

Albert Kaminsky, Salamanca, N. Y.

Application March 16, 1933. Serial No. 661,131

6 Claims. (Cl. 285—182)

This invention relates to pipe connections and has for an object to provide an improved construction whereby pipes may be joined firmly and accurately in a minimum time and with minimum effort.

Another object of the invention is to provide a construction which may be used in connecting pipes which act as conduits for electric wires, the structure being such that a strong, mechanical structure is presented and one capable of being quickly applied.

A further object of the invention is to provide an improved connection for pipes for any desired purpose, the structure being such that the center part is reinforced and the other parts formed to present a gripping and holding action for holding the ends of the pipes juxtaposed.

In the accompanying drawing—

Figure 3:
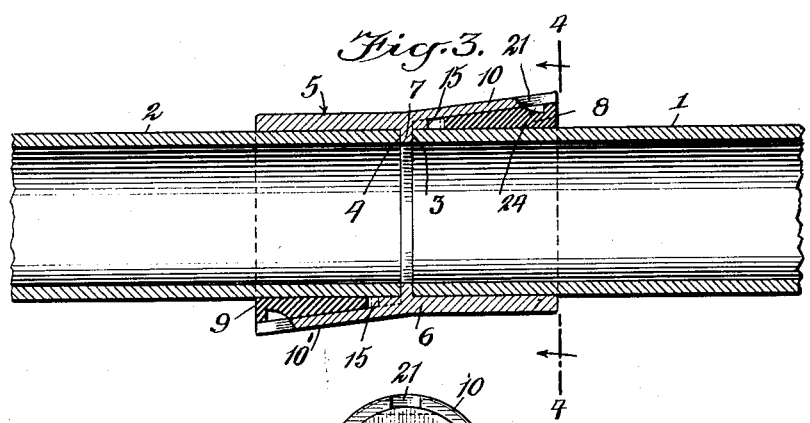
Figure 3 is a sectional view through Figure 2, on the line 3—3.
Figure 4:
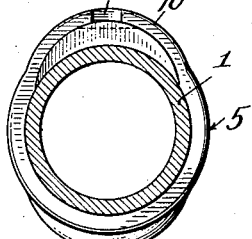
Figure 4 is a transverse, sectional view through Figure 3 on the line 4—4.

Referring to the accompanying drawing by numerals, 1 and 2 indicate pipes with their respective ends 3 and 4 juxtaposed, as clearly shown in Figure 3. The connector 5 is adapted to be quickly applied and to firmly hold the pipes in their aligned position. This arrangement is particularly adapted for conduits carrying electric wires, but may be used for connecting pipes for many other purposes. The connector 5 is formed from a tubular body 6 having an inwardly extending annular flange 7 against which the ends 3 and 4 rest. The tubular body 6 is adapted to fit the pipes 1 and 2 with a free sliding fit, and in order to lock the pipes in their end-to-end position locking wedges 8 and 9 are provided. These wedges are fitted into the respective raised portions 10 and 10'.

Figure 1:
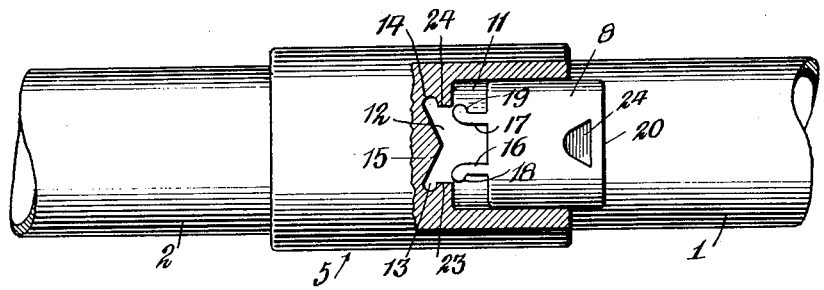
Figure 1 is a top plan view of the adjacent ends of two pipes and a coupling embodying the invention applied thereto, part of the coupling being broken away to illustrate the construction thereof.
Figure 2:
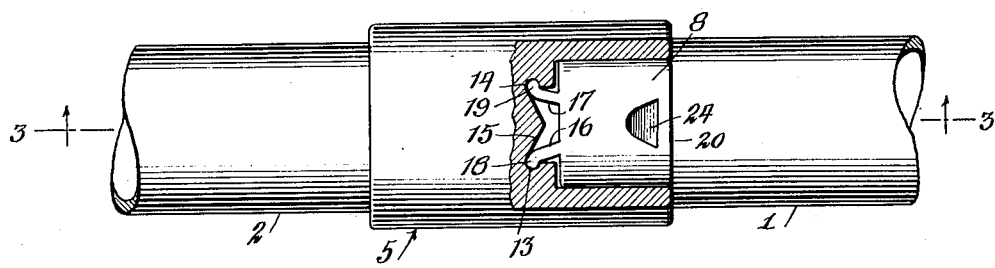
Figure 2 is a view similar to Figure 1 but showing the parts in their locked position.

As both of these raised portions and as both the wedges are identical in structure, a description of one will apply to both. As shown in Figures 1 to 3, the raised portion 10 is formed with a rectangular socket 11 merging into a neck opening 12, which in turn merges into laterally extending pockets 13 and 14. Between the pockets 13 and 14 there is arranged a V-shaped structure 15 which acts as a cam for deflecting the locking fingers 16 and 17, which fingers have locking knobs 18 and 19 positioned to engage the cam 15 and be diverted into the pockets 13 and 14 when the fingers 16 and 17 have been bent as shown in Figure 2. Normally the knobs 18 and 19 are a distance apart which permits them to be easily moved through the neck opening 12. After having moved through the neck opening 12, the end 20 is struck with a hammer or other implement and the wedge driven into the position shown in Figures 2 and 3. It will be understood that the other wedge is operated in a similar manner, so that the complete connector is in operative position when the parts are as shown in Figure 3.

It will be understood that the knobs 18 and 19 are round and interlock with the shoulders 22 and 23, but may be forced therefrom by an implement placed in the depression 24 and driven towards the right, as shown in Figure 2. This will cause the fingers 16 and 17 to bend back to substantially the position shown in Figure 1. The portion 10 is provided with a notch or cutaway part 21 so that a chisel or other implement may be fitted into the depression 24 and then used to drive out the wedge 8.

When it is desired to connect the ends of two pipes together, the tubular body 6 of the connector is slipped over the end of one pipe until the flange 7 strikes the pipe. The other pipe is then slipped into the position shown in Figure 3 and then the wedges 8 and 9 are driven into their functioning position. The connector is then in complete functioning position and the pipes 1 and 2 are locked together in interalignment.

I claim:—

1. A pipe connector comprising a tubular body formed with a socket near each end positioned out of alignment, each of said sockets having locking pockets extending therefrom and a wedge for each socket, said body between said pockets being inclined in opposite directions and merging into the respective pockets, each of said wedges having projecting members adapted to engage the inclined portion of said body and be spread thereby so as to enter said pockets while the wedge is being forced into its functioning position, whereby the wedges are locked against accidental removal.

2. A connector for connecting pipes, comprising a tubular body having a socket at each end and inclined pockets extending from each socket, a wedge for each socket adapted to be forced into position for pinching the pipes extending into the tubular body for locking the pipes in place, each of said wedges having a pair of normally parallel fingers adapted to be spread and thereby forced into said pockets when the wedges are forced into functioning position, whereby the wedges are normally prevented from reverse movement.

3. A pipe connector comprising a tubular body having on diametrically opposite sides and also on opposite ends raised portions having thereunder a wedge receiving socket, said sockets having a neck portion extending therefrom merging into laterally extending pockets, the material of said body between said pockets being substantially V-shaped to present cams, a wedge for each of said sockets, each of said wedges having a pair of fingers extending therefrom and merging into rounded ends, said fingers being spaced apart sufficiently to pass through said neck and engage said cams and be bent by the cams so that the ends will be positioned in said pockets when the wedge is in full functioning position.

4. A pipe connector including a tubular body having an inwardly extending annular flange against which the ends of two pipes are adapted to abut, and a pair of wedges, said wedges being arranged at opposite ends of the tubular body and acting against the tubular body and the respective pipes for locking the pipes in the tubular body, each of said wedges having means interlocking with the tubular body for preventing accidental removal.

5. A pipe connector including a tubular member for receiving the ends of two pipes, a socket in the end of said tubular member, said socket merging into a pair of laterally extending pockets, and a wedge arranged in said socket, said wedge having a pair of extending arms positioned in said pockets when the wedge is in functioning position.

6. A pipe connector comprising a tubular member for receiving the ends of pipes to be connected, said tubular member being formed with an inwardly extending member for centering the adjacent ends of said pipes, said tubular member having a socket at each end, said socket being at opposite sides of said tubular member, a wedge fitted into each socket for pinching the respective pipes for locking the same in the tubular member, and means forming part of the tubular member and part of the respective wedges arranged beyond the socket, said means interlocking and normally holding the wedges in their functioning position.

ALBERT KAMINSKY.